United States Patent [19]

Johnson

[11] 4,118,868

[45] Oct. 10, 1978

[54] CHILD HEIGHT GAUGE

[75] Inventor: Dennis Elmer Johnson, Grafton, Wis.

[73] Assignee: Densen Common, Incorporated, Grafton, Wis.

[21] Appl. No.: 780,628

[22] Filed: Mar. 23, 1977

[51] Int. Cl.² .............................................. G01B 3/06
[52] U.S. Cl. .................................... 33/169 R; 33/105
[58] Field of Search ................ 33/105, 137 R, 169 R, 33/174 D, 138

[56] References Cited

U.S. PATENT DOCUMENTS

| | | | |
|---|---|---|---|
| 1,608,771 | 11/1926 | Cary | 33/169 R |
| 1,974,085 | 9/1934 | Shields et al. | 33/169 R |
| 3,313,030 | 4/1967 | Heys | 33/169 R |
| 3,336,674 | 8/1967 | Higgins et al. | 33/138 |

FOREIGN PATENT DOCUMENTS 10,628 of 1891 United Kingdom .................. 33/169 R Primary Examiner—Charles E. Phillips
Attorney, Agent, or Firm—Ralph G. Hohenfeldt

[57] ABSTRACT

A child height measuring and data recording device comprises generally planar rigid panels having transverse pins at their ends for snapping into slots in connectors which articulate the sections for folding and unfolding. One panel is fastened to a wall and the others may be folded over it when not in use or unfolded to hang along the wall during making measurements and recording data. The front faces of the respective panels have parallel coextensive data channels. One channel has means for retaining photographs and the other has English and metric linear scales for measuring height. A hinged and captured connector is used for constraining the panels in folded condition.

5 Claims, 7 Drawing Figures

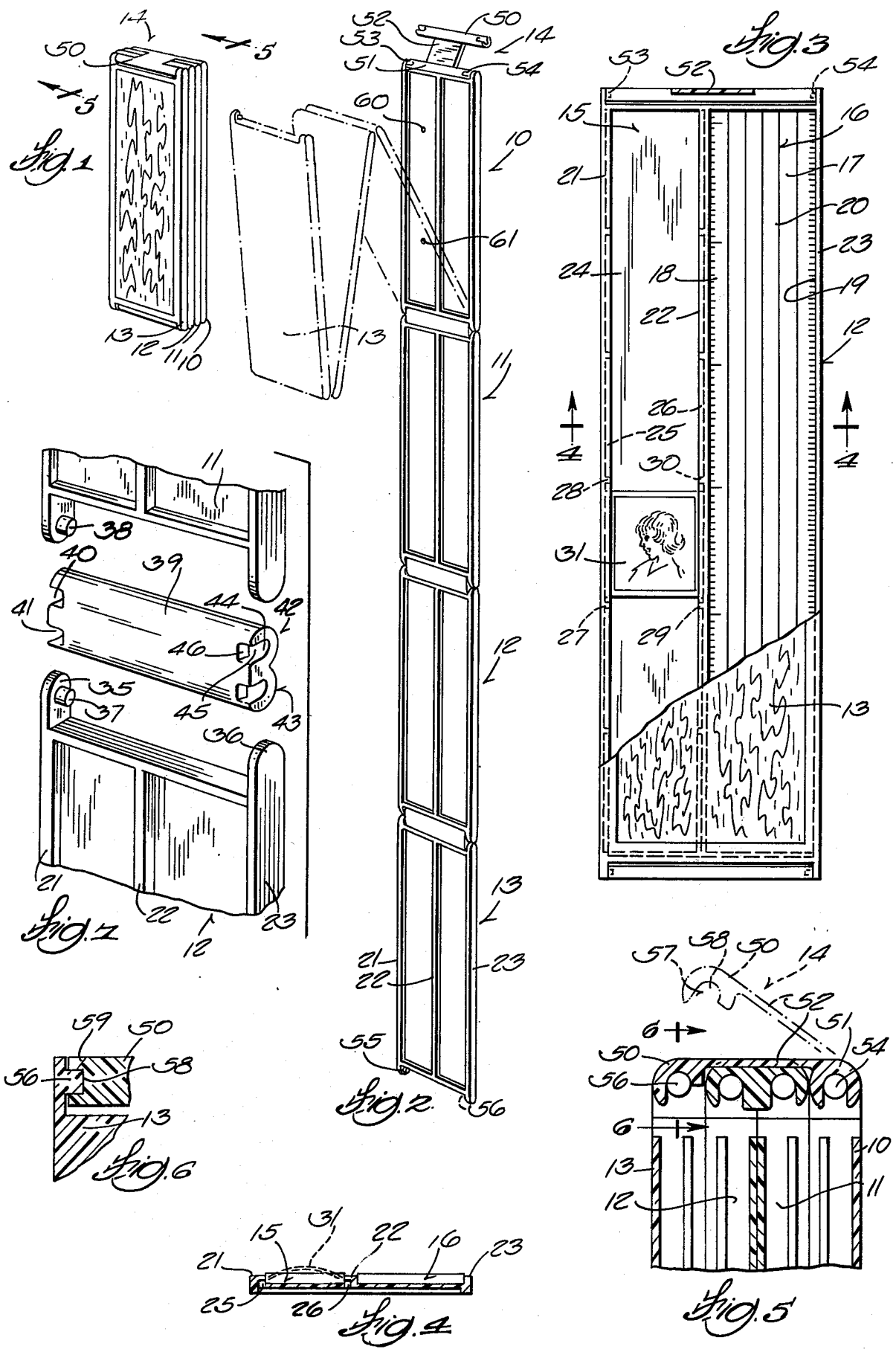

CHILD HEIGHT GAUGE

BACKGROUND OF THE INVENTION

This invention relates to a device for measuring the height of a growing child and for recording data that is descriptive of the child at the times height measurements are made. Prior devices for the same general purposes may be seen in U.S. Pat. Nos. 1,608,771 and 1,974,085.

SUMMARY OF THE INVENTION

In general terms, the new device comprises several generally planar and rectangular plastic panels which are hinged to each other. The uppermost panel may be fastened to a wall where it is convenient to locate a child or other person for taking a height measurement. The other panels may be folded and superposed over each other and over the fixed panel and latched for storage. The other panels may also be unlatched and allowed to unfold and hang along the wall's surface to permit a height measurement. The exposed face of each panel has a pair of parallel data channels. English and metric height scales are marked in one of the channels which also provides locations for entering data that is pertinent to a growing child. The other channel has laterally spaced apart slots for engaging the edges of a series of photographs to show the appearance of the individual contemporaneously with the taking of height measurements and recording of other data.

The panels are coupled with connectors that serve as hinges and articulate the panels. The panels and hinge components are preferably molded of synthetic resin or plastic material which becomes rigid after molding. A latch which has the general construction of the hinge and connector components is used to constrain the panels in folded and stored condition when the device is not in use.

One object of this invention is to provide a height measuring and data recording device which may be assembled from molded basically identical plastic sections resulting in low production cost and, hence, a capability for being sold at a price which is attractive to purchasers.

Another object is to provide a device of the character described which is rugged and not subject to deterioration or loss of attractiveness in the span of years over which it may be used for accumulating data on a particular growing individual.

Another object is to provide a device which has means for conveniently inserting a sequence of photographs depicting the appearance of the individual in correlation with contemporaneously recorded data. An adjunct of this object is to provide for inserting and retaining photographs without the use of adhesives.

Still other objects of the invention are to provide a device that is dimensionally stable, compact, esthetically pleasing and easy to use.

How the foregoing and other more specific objects of the invention are achieved will appear in the ensuing more detailed description of a preferred embodiment in which reference will be made to the drawing.

DESCRIPTION OF THE DRAWING

FIG. 1 is a perspective view of the device as it appears when it is fastened to a wall and in folded or stored condition;

FIG. 2 is a view of the device in an unfolded condition where the panels, as they would be disposed in an initial state of unfolding, are shown in phantom lines;

FIG. 3 is a plan view of one of the panels with the panel normally superposed over it broken away;

FIG. 4 is a transverse section taken along a line corresponding with 4—4 in FIG. 3;

FIG. 5 is a fragmentary vertical section taken along a line corresponding with 5—5 in FIG. 1 and showing particularly well the latch which is used for retaining the panels in stored condition;

FIG. 6 is a fragmentary section taken along a line corresponding with 6—6 in FIG. 5; and FIG. 7 is an exploded view showing the ends of a pair of panels and the connector for hinging them together.

DESCRIPTION OF A PREFERRED EMBODIMENT

Attention is now invited to FIGS. 1 and 2 which show the device in stored and unfolded conditions, respectively. This embodiment comprises four generally planar and rectangular panels 10-13. In FIG. 1 the panels are folded so they are superimposed or congruent with each other and constrained from unfolding with a latch that is generally designated by the reference number 14. More or fewer than four panels could be used but this number permits meeting overall length requirements without developing an unduly thick composite under storage conditions such as would be the case if more than four panels were used. Using fewer panels also reduces the number of hinges and, hence, makes assembly easier than would be the case if a larger number of panels were used.

A typical panel 12 will now be described in detail in reference to FIGS. 3 and 4 primarily. Panel 12 is a generally planar molded plastic piece. The front face of panel 12 as viewed in FIG. 3 has two data channels 15 and 16 which are parallel to each other. Channel 15 is for retaining photographs as will be discussed in more detail later. Channel 16 has a durable paper strip 17 adhered to it. A scale 18 for enabling measurement of a child's height in inches and fractions of inches is printed on the left margin of strip 17 and a metric scale 19 is printed on the right margin. The numerals indicating increments of length are omitted but it will be evident that when the sections are unfolded and disposed along a vertical wall as they are in FIG. 2, a child's height may be determined by standing the child adjacent the sections and directing a straightedge from the top of the child's head to a point on either of the scales. Data such as the height, weight and the data on which the height measurement was taken may be recorded on lines such as the one marked 20 on the paper strip in channel 16.

Channels 15 and 16 are defined by parallel upstanding ribs 21, 22 and 23. These ribs are molded integrally with the thin planar panel base 24. Ribs 21 and 22 which form the boundaries of channel 15 are undercut to provide slots or longitudinally extending grooves 25 and 26 which may be seen in section in FIG. 4. As can be seen in FIG. 3, the grooves are subdivided with cross webs 27-30 which set the boundaries of areas in which photographs such as the one marked 31 may be inserted. The photographs provide a record of the child's appearance at the time when the data recorded at a corresponding level in channel 16 was taken. A desirable feature of the device is that the photographs may be inserted easily and retained without the use of adhesives. To insert a photograph it is only necessary to form it into an arc so it fits between ribs 21 and 22 and then let it spring into its normal flat condition under the influence of its inherent resiliency. The procedure is illustrated in FIG. 4 where a curved or flexed photograph 31 is shown in dashed lines. If the photograph is not stiff enough to be springy, simply pressing on it will cause its edges to expand outwardly so as to be retained in the grooves 25 and 26.

The manner in which the planar panels 10–13 are articulated will now be described primarily in reference to FIG. 7 which shows opposite ends of panels 11 and 12. Panel 12 typically has tongues 35 and 36 which are essentially extensions of ribs 21 and 23, respectively. Each of the tongues has a coaxial integrally molded laterally extending pin such as 37. A typical pin 38 is also visible on panel 11. The pins engage with a connector 39 which may be a plastic extrusion. The connector has four similar sockets 40–43 in its ends. Typical socket 42 has a central cylindrical hole 44 which has a diameter just large enough to receive pins such as 37 and 38. A slot 45 extends radially from hole 44. The inner end of this slot is beveled as at 46 and the beveled portion overhangs hole 44. To connect panels 11 and 12, pins such as 37 and 38 are pressed into slots such as 45 and the tips of the pins follow the beveled surfaces 46 which act as inclined planes to cause the tongues 35 and 36 to spread outwardly. When the pins are pressed deeply enough into slots 45 they pass the beveled surface and drop into the holes 44 where they are securely held by the tendency for the tongues 35 and 36 to assume a straightened condition. It will be evident that the rigid plastic tongues must be molded thin enough to permit them to flex and spread as the pins are spread by the beveled surfaces 46 until the pins drop into the socket holes. The width of the connectors 39 must be great enough to permit adjacent panels 11 and 12 to lie flatly on each other when the device is folded.

The latch 14 which retains the device in folded condition as in FIG. 1 will now be described in reference to FIGS. 2, 3, 5 and 6. In FIGS. 2 and 5 one may see that the latch 14 comprises two similar cross members 50 and 51 which are spanned by an integral plastic web 52. The members have end sockets similar to those of connector 39. As can be seen in FIG. 2, cross member 51 remains engaged with pins 53 and 54 on the upper end of panel 10. Cross member 50 is selectively engageable and disengageable with respect to pins 55 and 56 at the lower end of panel 13. In FIG. 1, cross member 50 is shown engaged and in FIG. 2 it is shown disengaged from pins 55 and 56.

The ends of cross member 51 have sockets which are substantially identical to sockets 40–43 in connector 39. Thus, after the device is assembled and in use, cross member 51 remains pivotally connected to pins 54 and 53 whether the device is folded or unfolded. Cross member 50, however, is adapted to be snapped onto and released from pins 56 and 55 of panel 13. As can be seen in FIG. 6, cross member 50 has a hole 58 for receiving pin 56 on panel 13. There is a beveled surface 59 extending away from hole 58 and overhanging the hole. This beveled surface spreads pin 56 and its counterpart pin 55 just slightly so that the cross member will engage with a snap action but can be easily disengaged with finger pressure.

Uppermost planar panel 10 has a pair of spaced apart holes 60 and 61 to permit mounting the device flatly against a wall with screws, not shown. To mount the device it is unfolded as in FIG. 2 and screws are driven through holes 60 and 61.

The scales 18 and 19 do not begin at zero at the lowermost ends of panel 13 but, instead, they start at about 51 cm or 20 inches. Thus, the device must be mounted off of the floor by this distance. This does not limit the usefulness of the device for measuring infants since on an average, they are taller than 51 cm at birth. Not having the scales start at zero permits reducing the number of panels and, hence, the thickness of the device when it is folded.

Although the new height measuring and data recording device has been described in detail, such description is intended to be illustrative rather than limiting, for the device may be variously embodied and is to be limited only by interpretation of the claims which follow.

It is claimed:

1. A device for obtaining and recording data relative to a person and for holding photographs of a person in proximity with pertinent data comprising:
    a series of rigid panels for being disposed vertically adjacent each other in end to end relationship, said panels each having a front and a rear face,
    hinge means for joining adjacent panels in articulated fashion,
    each front face having laterally spaced apart parallel longitudinally extending ribs defining a pair of adjacent channels,
    a corresponding channel on each of said panels having a portion of a scale for measuring the height of a person and providing an area for recording data,
    two of said ribs defining one channel having longitudinally extending grooves for receiving the longitudinally extending edges of said photographs, said grooves being open toward each other such that a photograph may be inserted by forming it into a curve and allowing it to expand for said edges to engage in said grooves, respectively,
    a plurality of stop means disposed in a groove, said stop means being spaced apart longitudinally for consecutive pairs of said stop means to define the boundaries between adjacent photographs and to prevent said photographs from shifting longitudinally, and
    said hinge means being constructed and arranged for enabling said panels to be folded into parallel and flat contact relationship with each other and with front faces of adjacent panels in said series facing each other so that said data and photographs will not be exposed when said device is folded.

2. A device for obtaining and recording data relative to a person comprising:
    a plurality of elongated rigid panels for being disposed vertically adjacent each other in end to end relationship,
    a pair of tongue means extending generally longitudinally from the end of each of the panels, said tongue means being capable of flexing away from each other,
    pairs of coaxial pins extending toward each other from said tongue means, respectively,
    connector members having a first pair of coaxial holes for receiving a pair of pins of one panel and a second pair of coaxial holes spaced from said first pair for receiving the pins of an adjacent panel to thereby pivotally connect said panels and allow said panels to be folded in parallelism with each other, a beveled area contiguous with each of said cylindrical holes for spreading said tongues and said pins sufficiently for said pins to enter said holes, each of said panels having on one side of its face a portion of a scale for measuring the height of a person, and the other side of each said face having means defining longitudinally extending laterally spaced apart grooves for receiving the edges of photographs.

3. The device as in claim 2 including a latch member having one pair of sockets for receiving the pair of pins on the uppermost of said panels to thereby pivotally connect with said panel, said member having another pair of sockets engageable with the pair of pins at the lower end of the lowermost of said panels when said panels are folded onto each other to thereby constrain said panels in folded condition.

4. The device as in claim 3 wherein at least one pair of said sockets in said latch member are composed of a cylindrical hole and a beveled area contiguous with and extending into said hole whereby to spread the pins on said latch means until said pins enter said hole.

5. The device as in claim 2 wherein said panels are comprised of plastic material.

* * * * *